United States Patent [19]
Bunts

[11] 3,880,220
[45] Apr. 29, 1975

[54] TIRE BEAD LOOSENING TOOL

[75] Inventor: Harold A. Bunts, Akron, Ohio

[73] Assignee: The Goodyear Tire & Rubber Company, Akron, Ohio

[22] Filed: Mar. 26, 1973

[21] Appl. No.: 344,793

Related U.S. Application Data

[62] Division of Ser. No. 317,015, Dec. 20, 1972, abandoned.

[52] U.S. Cl. .............................................. 157/1.17
[51] Int. Cl. .............................................. B60c 25/06
[58] Field of Search ......... 157/1.17, 1.2, 1.26, 1.28, 157/1.33

[56] References Cited
UNITED STATES PATENTS

| 2,753,923 | 7/1956 | Bowyer | 157/1.17 |
|---|---|---|---|
| 2,900,016 | 8/1959 | Woodward | 157/1.17 |
| 3,344,833 | 11/1967 | Pile et al. | 157/1.17 |

*Primary Examiner*—Granville Y. Custer, Jr.
*Attorney, Agent, or Firm*—F. W. Brunner; P. E. Milliken

[57] ABSTRACT

A tire bead loosening tool in combination with a wheel rim having a specially designed offset on the side ring retaining flange for receiving attachment hooks of the loosening tool.

4 Claims, 5 Drawing Figures

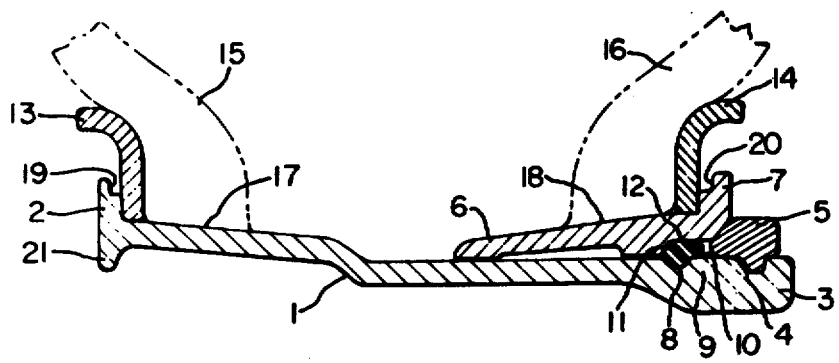
FIG. 1
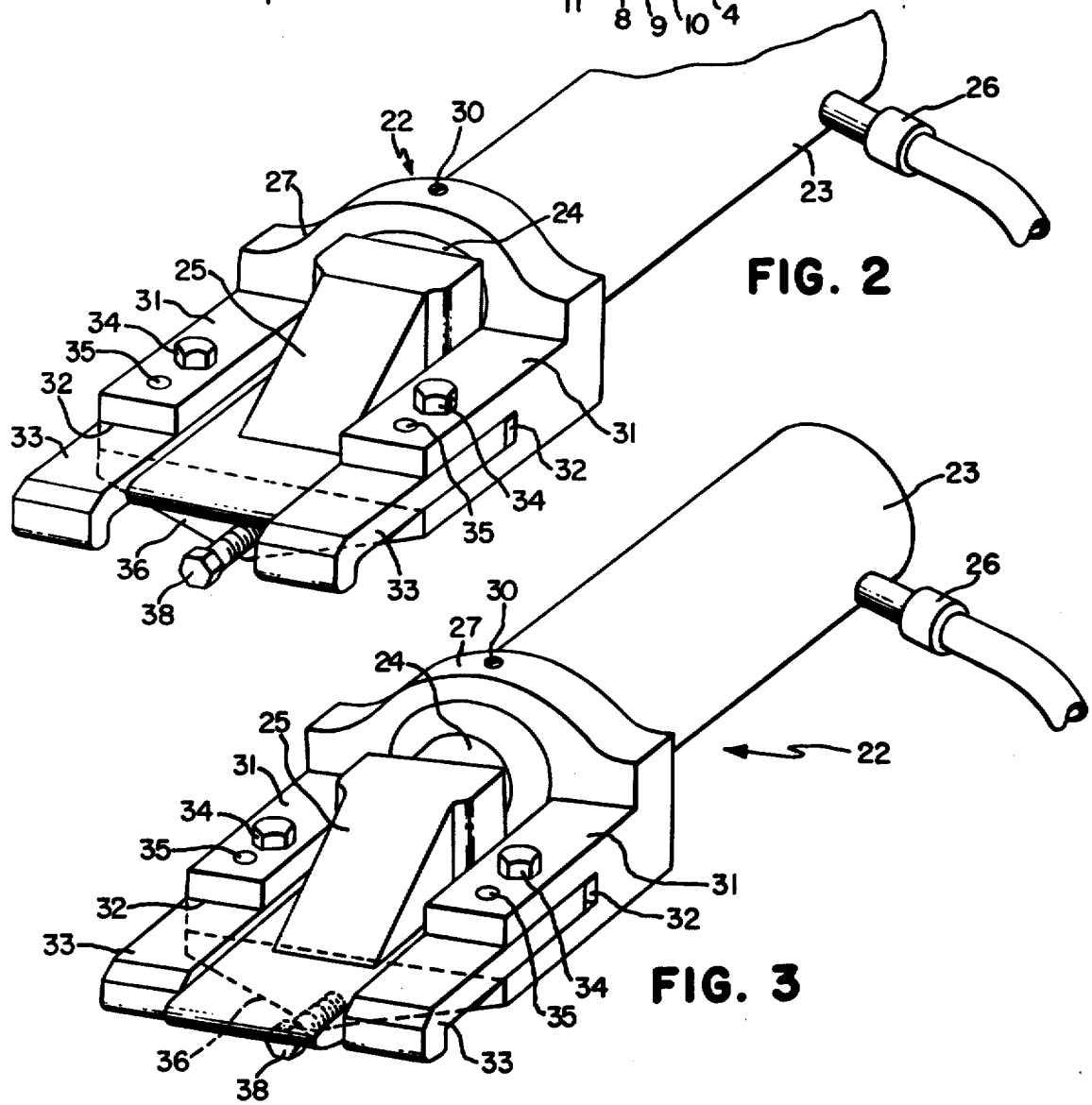
FIG. 2
FIG. 3

TIRE BEAD LOOSENING TOOL

This is a division of application Ser. No. 317,015 filed Dec. 20, 1972, now abandoned, which, in turn, is a issue application of U.S. Pat. No. 3,574,318 issued Apr. 13, 1971, which was originally filed as application Ser. No. 851,684, on Aug. 20, 1969.

This invention relates to a specially designed wheel rim for use on earthmovers and other large vehicles of this type in combination with a bead loosening tool specially adapted to engage this particular wheel rim design.

BACKGROUND OF THE INVENTION

In the past, various bead loosening tools have been devised for breaking the tire loose from the bead seat on large wheels of the type used on earthmovers and other heavy off-the-road vehicles. Many of these bead loosening tools have been designed for use with particular type of wheel rim having a particular contour or surface which may be gripped by jaws on the tool or having special adapters on the rim to which the bead loosening tool may be attached. A typical example of such device is shown in U.S. Pat. No. 3,344,833 issued to W D Pile et al. showing two different types of adapters which are welded to a side ring of a wheel rim and a bead loosening tool with special hooks for gripping, or engaging the adapters.

OBJECTS OF THE INVENTION

It is a primary object of this invention to provide a wheel rim of simple design with part of the rim being specially contoured for receiving attachment hooks of a bead loosening tool.

Another object of this invention is to provide a bead loosening tool which may be easily attached to a specially designed wheel rim with a minimum amount of time and effort and may easily be detatched after the tire bead has been broken loose from the bead seat. These and other objects of the invention will become more fully apparent as the description proceeds in the following specification and the accompanying drawings.

BRIEF DESCRIPTION OF THE DRAWINGS

FIG. 1 is a cross-sectional view through a typical wheel rim assembly of the invention;

FIG. 2 is a perspective view of the bead loosening tool of the invention with the plunger in a retracted position;

FIG. 3 is a perspective view of the bead loosening tool shown in FIG. 2 but with the plunger in the extended position;

DESCRIPTION OF THE PREFERRED EMBODIMENTS

Figure 5:
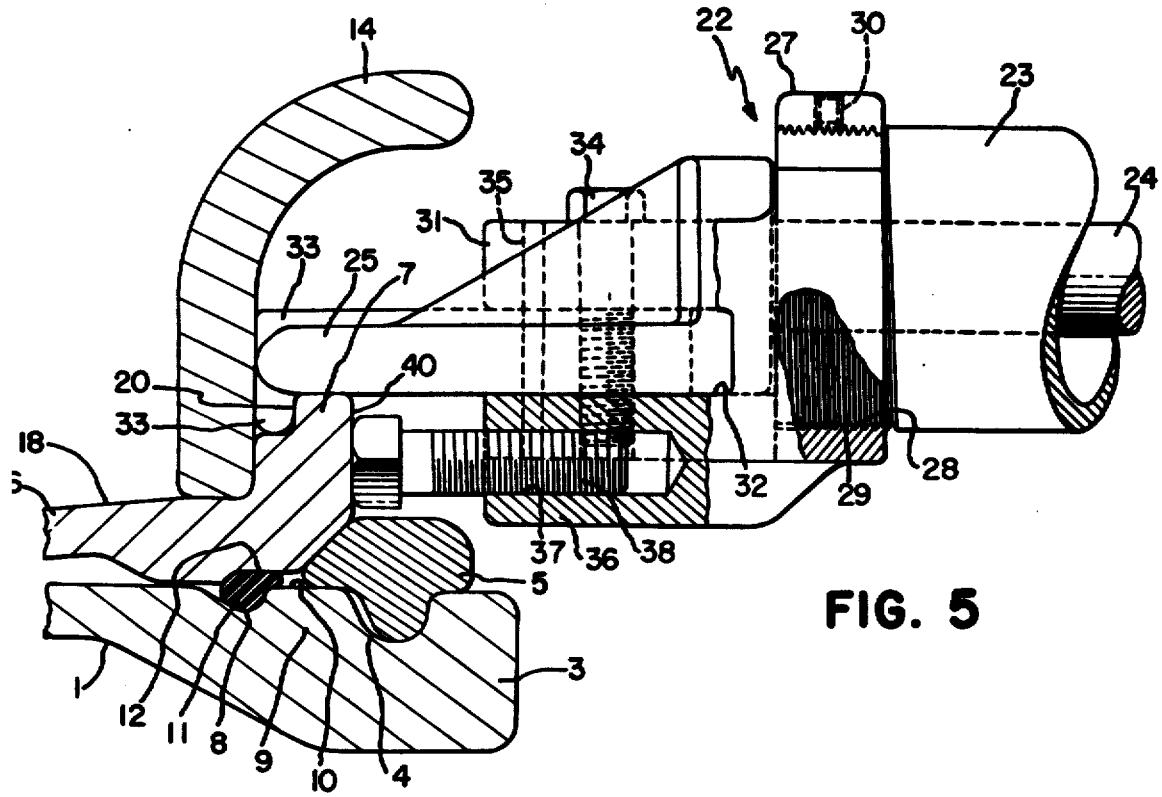
FIG. 5 is a cross-sectional view of the bead loosening tool and rim shown in FIG. 4 with portions broken away to show the manner in which the tool is attached to the side flange of the rim when used to loosen the bead seat.

In FIG. 1, a typical multiple piece rim assembly for large off-the-road or earthmover tubeless or tube type tires is shown in which the numeral 1 represents an endless rim base having a side ring retaining flange 2 extending radially outwardly along one edge thereof and an integral gutter edge portion 3 along the opposite edge. The gutter edge portion 3 has an endless radially outwardly facing gutter or channel 4 into which a split lock ring 5 is mounted to engage an annular bead seat band 6 which telescopes over the rim base 1 and is spaced radially outwardly therefrom. The bead seat band 6 has a radially inner and radially outer face and a side ring retaining flange 7 extending radially outwardly from its axially outer edge. An annular channel 8 is spaced axially inwardly on the rim base 1 from the gutter 4 thereby forming a radially outwardly facing annular ledge 9 therebetween. A lock ring seating surface 10, formed by the radially outer face of the ledge 9, lies in the same plane as the adjacent portions of the radially outer face of the rim base 1. An O-ring 11 is located between the bead seat band 6 and the rim base 1 in the channel 8 so that when the bead seat band 6 is in the assembled position on the base 1, the 0-ring is distorted under axial and radial stresses by an annular shoulder 12 on the radially inner face of the bead seat band 6 to seal the passageway between the rim base 1 and the bead seat band 6. An endless flanged side ring 13 telescopes over the rim base 1 and engages the retaining flange 2 to fix the position thereof. A similar flanged side ring 14 telescopes over the bead seat band 6 and engages the retaining flange 7. The side rings 13 and 14 engage the beads 15 and 16 of a tire (not shown) when mounted on the rim to retain it in position thereon.

When the tire is mounted on the rim assembly, the bead 15 seals against the bead seat portion 17 which lies axially inwardly on the rim base 1 from the assembled side ring 13 and the bead 16 seals against a bead seat portion 18 which lies axially inwardly from the assembled side ring 14 on the bead seat band 6. The bead seat band 6 is retained on the rim base 1 by the lock ring 5 which extends into the gutter 4 and is retained thereby.

Both the side ring retaining flanges 2 and 7 respectively, have radially outwardly facing annular offsets 19 and 20 on the axially inner sides of said flanges for receiving retaining hooks of a bead loosening tool which will be described later in the specification. A flange 21 forms a radially inwardly facing extension of the flange 2 and serves to strengthen the axially outer edge of the rim base 1. The additional material used in the outside diameter to form offsets 19 and 20 also serves to strengthen the axially outer edge of the rim base 1 and bead seat band 6. While in the preferred embodiment the offsets 19 and 20 extend around the entire circumference of flanges 2 and 7, in some instances it is possible that these offsets extend only part way around the circumference of flanges 2 and 7.

Referring now to FIGS. 2 and 3, a bead loosening tool is indicated generally by the numeral 22. The bead loosening tool has a hydraulic ram 23 which serves as an actuator for the tool and drives a plunger 24 having a plunger head 25. A hydraulic supply line 26 is attached to the actuator 23 and supplies the necessary hydraulic pressure for operating the plunger 24. A yoke member 27 is attached to the end of the actuator 23 from which the plunger 24 extends. As may be best seen in FIG. 5, the yoke member 27 has a threaded hole 28 therethrough which engages a threaded end portion 29 on the actuator 23. A retaining screw 30 passes through the yoke 27 and engages the actuator 23 to prevent it from rotating in the yoke 27 and coming loose therefrom. The yoke member 27 has a pair of spaced-apart outwardly extending arm members 31, each of which has a slot 32 therethrough for receiving a hook member 33. Each of the hooks 33 is retained in its respective slot 32 by a bolt 34 and a pin 35 which prevents the hook member 33 from rotating about the bolt 34. The arm members 31 with the hook members 33 therein are spaced apart a sufficient distance to permit the plunger head 25 to move back and forth between them when actuated by the plunger 24. A bridge member 36 extends between the lower halves of each of the arm members 31 and contains a centrally located threaded hole 37 through which a pressure bolt 38 extends. The bolt 38 is positioned against the axially outer face 40 of the side ring retaining flange 7 when the hooks 33 are positioned in the offset 20 during the bead loosening operation. By tightening the pressure bolt 38 against the outer face 40, the hooks 33 are drawn against the axially inwardly facing edge of the offset 20 thereby clamping the bead loosening tool 22 tightly to the rim base 6 so that the plunger 24 may drive the plunger head 25 against the side ring 14 and force it axially inwardly to force the tire bead off the bead seat and break the seal.

Figure 4:
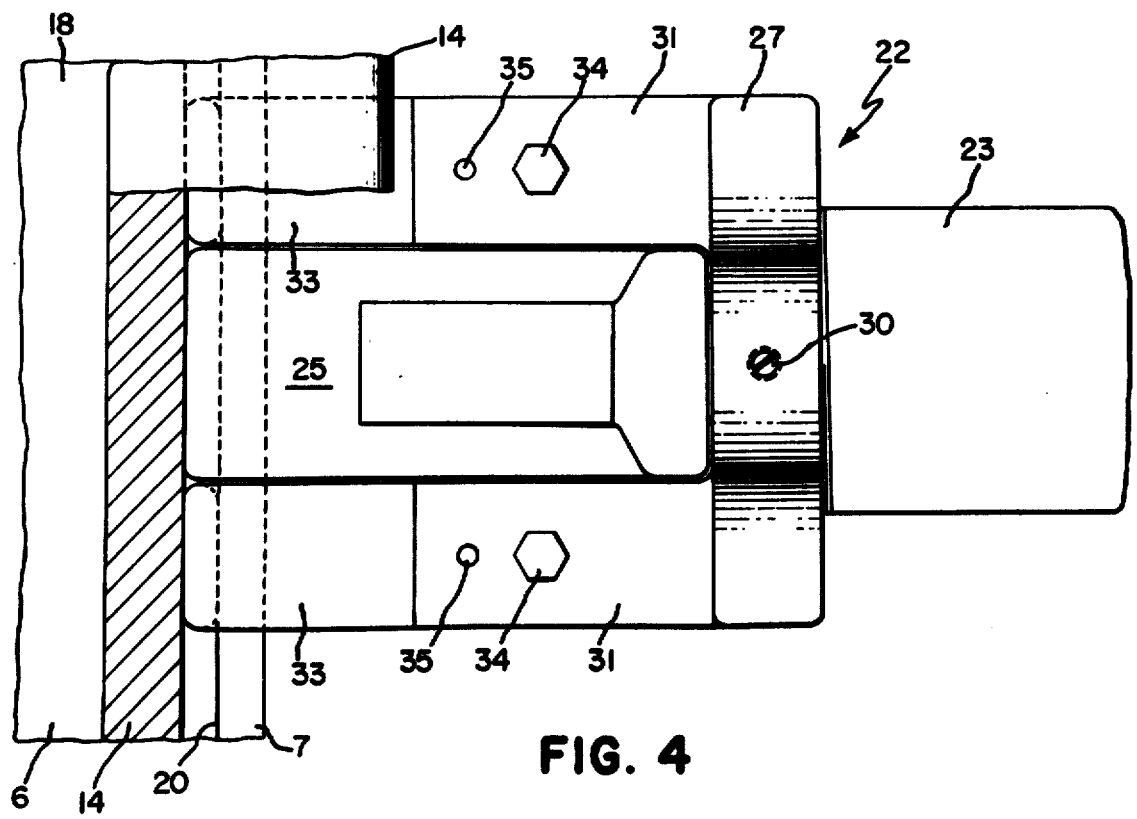
FIG. 4 is a fragmentary plan view showing the bead loosening tool of the invention engaging a wheel rim in operative position for loosening the tire bead from the bead seat.

FIG. 4, used in combination with FIG. 5, shows the overall shape and structure of the bead breaking tool 22 and the manner in which it clamps onto the side ring retaining flanges of a wheel. Although the bead breaking tool 22 has been shown attached to the flange 7, it will, of course, be realized that it can be applied in the same manner to the flange 2 by inserting the ends of the hooks 33 into the offset 19 and then tightening the pressure bolt 38 to clamp the tool in operative position prior to actuating the plunger 24. Although the hooks 33 have been shown as lying in a flat plane they may be inclined to each other or curved to better fit the curved contour of the rim on which they will be used. Various modifications may be made in the arrangement and shape of the hooks 33 without departing from the scope of the invention as long as the hooks are of a proper shape and contour to properly engage the offset provided for them in the side ring retaining flange. Various other modifications may also be made without departing from the scope of the invention.

We claim:

1. A tire-bead-loosening tool adapted to loosen the bead of a tire on a special wheel rim having at least one removable side ring retained thereon by an annular radially outwardly extending side ring retaining flange, the side ring bearing against the axially inner surface of the retaining flange when in its normal assembled position on the rim with an inflated tire bearing against the side ring and having a tool-receiving offset at the axially inner edge of the retaining flange extending at least part of the distance around the circumference thereof, the bead-loosening tool comprising:
   A. an actuator;
   B. a plunger driven by the actuator for imparting inward movement to the side ring and the tire bead away from the ring retaining flange; and
   C. hook means mounted on the actuator especially adapted for engaging the tool-receiving offset in the retaining flange to hold the actuator in spaced relationship to the side flange during actuation of the plunger.

2. The tool claimed in claim 1 wherein the tool-receiving offset extends around the entire circumference of the retaining flange.

3. The tool claimed in claim 1 wherein the hook means comprise a pair of hooks mounted on the actuator and extending along each side of the plunger.

4. The tool claimed in claim 1 including adjustable means mounted on the actuator for bearing against the axially outer surface of the retaining flange and pulling the hook means tightly against the axially inner surface of the tool-receiving offset.

* * * * *